(12) United States Patent
Lee et al.

(10) Patent No.: US 10,586,963 B2
(45) Date of Patent: Mar. 10, 2020

(54) SECONDARY BATTERY

(71) Applicant: SAMSUNG SDI CO., LTD., Yongin-si, Gyeonggi-do (KR)

(72) Inventors: Sanghyo Lee, Yongin-si (KR); Wonil Jung, Yongin-si (KR); Woohyuk Choi, Yongin-si (KR); Yeonhwa Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 217 days.

(21) Appl. No.: 15/462,637

(22) Filed: Mar. 17, 2017

(65) Prior Publication Data
US 2017/0309881 A1 Oct. 26, 2017

(30) Foreign Application Priority Data
Apr. 25, 2016 (KR) .......... 10-2016-0050386

(51) Int. Cl.
*H01M 2/12* (2006.01)
*H01M 2/04* (2006.01)

(52) U.S. Cl.
CPC ......... *H01M 2/1241* (2013.01); *H01M 2/046* (2013.01); *H01M 2/0413* (2013.01)

(58) Field of Classification Search
CPC ... H01M 2/1241; H01M 2/046; H01M 2/0413
See application file for complete search history.

(56) References Cited

U.S. PATENT DOCUMENTS

| | | | | |
|---|---|---|---|---|
| 6,620,544 | B1* | 9/2003 | Shin ............... | H01M 2/0413 429/53 |
| 2007/0172728 | A1* | 7/2007 | Yamashita ...... | H01M 2/0413 429/174 |
| 2008/0152997 | A1* | 6/2008 | Lee ................. | H01M 2/0413 429/174 |
| 2009/0098445 | A1* | 4/2009 | Kim ................ | H01M 2/0413 429/72 |
| 2010/0143772 | A1* | 6/2010 | Byun .............. | H01M 2/0413 429/82 |
| 2015/0236317 | A1* | 8/2015 | Lee ................. | H01M 2/04 429/56 |

FOREIGN PATENT DOCUMENTS

| KR | 1020070093171 A | * | 9/2007 | ............ H01M 2/12 |
|---|---|---|---|---|
| KR | 10-2010-0065670 | | 6/2010 | |
| KR | 10-1062685 | | 9/2011 | |
| KR | 10-1487392 | | 1/2015 | |

OTHER PUBLICATIONS

English Abstract for KR20110035625 (A) dated Apr. 6, 2011 corresponds to KR 10-1062685 dated Sep. 6, 2011, 2 pages.
English Abstract for KR20140032193 (A) dated Mar. 14, 2014 corresponds to KR 10-1487392 dated Jan. 27, 2015, 1 page.

* cited by examiner

Primary Examiner — Muhammad S Siddiquee
(74) Attorney, Agent, or Firm — Lewis Roca Rothgerber Christie LLP

(57) ABSTRACT

A secondary battery includes: an electrode assembly; a case accommodating the electrode assembly; and a cap assembly coupled to a top portion of the case. The cap assembly includes a safety vent and a cap-up. The cap-up has grooves on a surface thereof. The safety vent includes a downwardly protruding portion, is under the cap-up, and is electrically connected to the electrode assembly at the protruding portion.

11 Claims, 5 Drawing Sheets

SECONDARY BATTERY

CROSS-REFERENCE TO RELATED APPLICATION

This application claims priority to and the benefit of Korean Patent Application No. 10-2016-0050386, filed on Apr. 25, 2016 in the Korean Intellectual Property Office, and all the benefits accruing therefrom under 35 U.S.C. § 119, the content of which is herein incorporated by reference in its entirety.

BACKGROUND

1. Field

Embodiments of the present invention relate to a secondary battery.

2. Description of the Related Art

When subjected to an abnormal condition, such as a short-circuit or an over-charge, an internal temperature of a secondary battery may increase and gases may be generated in the secondary battery, resulting in an increase in an internal pressure of the secondary battery.

For example, when a lithium secondary battery is overcharged, an electrolyte is decomposed and releases gases, such as carbon dioxide or carbon monoxide, resulting in an increase in the internal pressure of the secondary battery. In addition, when an over-current flows in the secondary battery due to over-discharge or short-circuit, the internal temperature rises, converting the electrolyte into a gas (e.g., into a gas state). Accordingly, the internal pressure and internal temperature of the secondary battery may increase and there may be a risk of ignition, causing a serious safety-related problem and ultimately deteriorating the overall performance and life characteristic of the secondary battery.

SUMMARY

Embodiments of the present invention provide a secondary battery having improved stability.

The above and other aspects of the present invention will be described in or will be apparent from the following description of exemplary embodiments thereof.

According to an embodiment of the present invention, a secondary battery includes: an electrode assembly; a case accommodating the electrode assembly; and a cap assembly coupled to a top portion of the case. The cap assembly includes a safety vent and a cap-up. The cap-up has grooves on a surface thereof. The safety vent has a downwardly protruding portion, is under the cap-up, and is electrically connected to the electrode assembly at the protruding portion.

The cap-up may include a flange portion contacting and coupled to the safety vent, a plurality of bridge portions protruding from the flange portion, and a plate portion at an interior edge of the bridge portions and coupled to the bridge portions.

The grooves may be on a surface of the flange portion.

The flange portion may have a ring shape, and the grooves may be arranged according to the shape of the flange portion.

The grooves may be connected to each other such that they form a continuous groove or ones of the grooves may be spaced from each other.

At least one of the grooves may be on a surface of each of the bridge portions.

The bridge portions may include a plurality of bridge portions connecting the flange portion and the plate portion to each other, and the grooves may be at boundaries between the bridge portions and the flange portion.

At least one of the grooves may be on a surface of each of the bridge portions.

The plate portion may have a circular plate shape, and the grooves may meet at the center of the plate portion and may be arranged in a Y-shaped configuration.

The grooves may be connected to each other such that they form a continuous groove or ones of the grooves may be spaced from each other.

As described above, in a secondary battery according to embodiments of the present invention, grooves are provided on an inner or outer surface of a cap-up and the cap-up is configured to rupture when a safety vent operates so that internal gases in a case can be easily released, thereby increasing the stability of the secondary battery and preventing chain ruptures or explosions.

BRIEF DESCRIPTION OF THE DRAWINGS

The above and other features of the present invention will become more apparent by describing, in detail, exemplary embodiments thereof with reference to the attached drawings in which.

DETAILED DESCRIPTION

Figure 1:
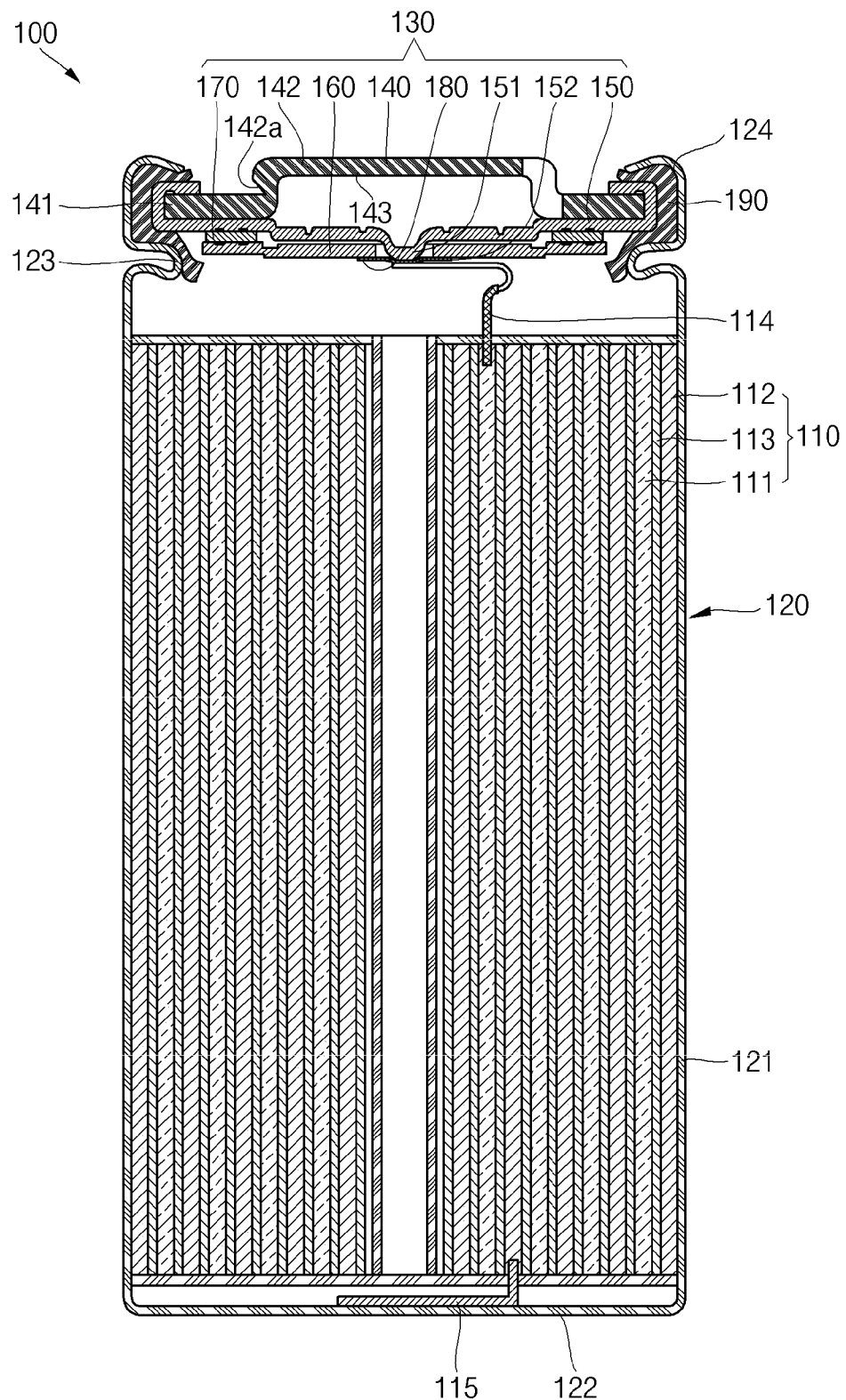
FIG. 1 is a cross-sectional view of a secondary battery according to an embodiment of the present invention.

Hereinafter, exemplary embodiments of the present invention will be described, in detail, with reference to the accompanying drawings such that they can easily be made and used by those skilled in the art.

It will be understood that when an element or layer is referred to as being "on," "connected to," or "coupled to"

another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Figure 2:
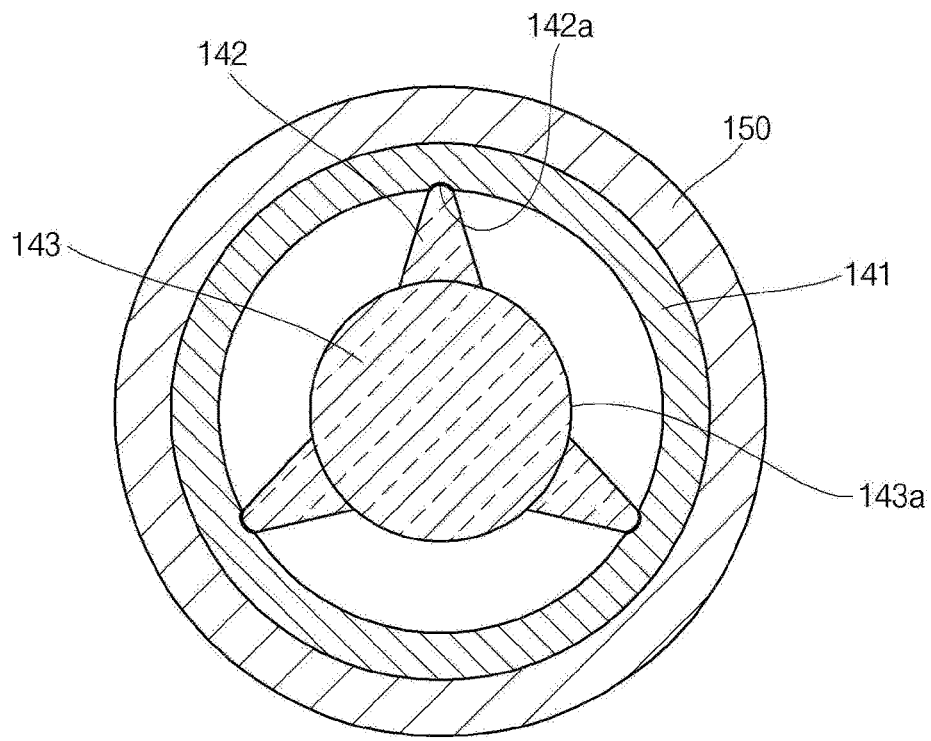
FIG. 2 is a plan view illustrating a connection relationship between (e.g., connection configuration) a cap-up and a safety vent in the secondary battery illustrated in FIG. 1.
Figure 3:
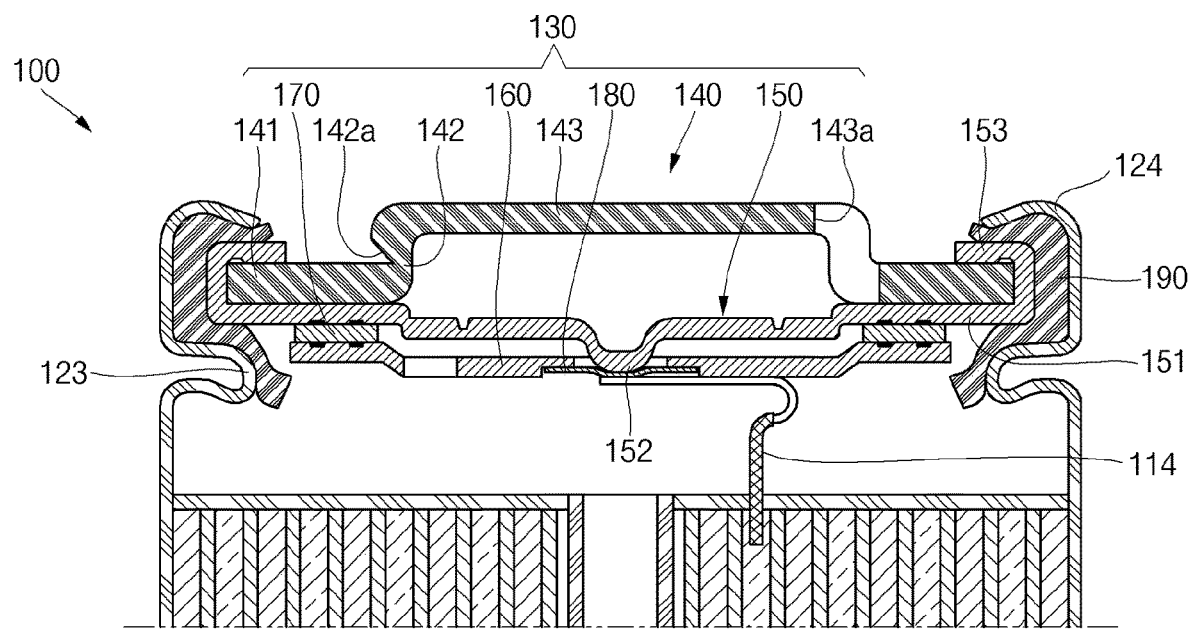
FIG. 3 is an enlarged cross-sectional view illustrating the connection relationship between the cap-up and the safety vent illustrated in FIG. 2.

FIG. 1 is a cross-sectional view of a secondary battery according to an embodiment of the present invention, FIG. 2 is a plan view illustrating a connection relationship between (e.g., connection configuration) a cap-up and a safety vent in the secondary battery illustrated in FIG. 1, and FIG. 3 is an enlarged cross-sectional view illustrating the connection relationship between the cap-up and the safety vent illustrated in FIG. 2.

Referring to FIGS. 1-3, the secondary battery 100 according to an embodiment of the present invention includes an electrode assembly 110, a case 120 accommodating the electrode assembly 110, a cap assembly 130 coupled to a top opening of the case 120, and a gasket 190 tightly coupling the case 120 and the cap assembly 130 to each other.

The electrode assembly 110 includes a first electrode plate 111, a second electrode plate 112, and a separator 113 interposed between the first electrode plate 111 and the second electrode plate 112. The electrode assembly 110 may be formed by winding a stacked structure including the first electrode plate 111, the separator 113, and the second electrode plate 112 in a jelly-roll configuration. In some embodiments, the first electrode plate 111 may function as a positive electrode and the second electrode plate 112 may function as a negative electrode. However, the present invention is not limited thereto, and in other embodiments, the first electrode plate 111 may function as the negative electrode and the second electrode plate 112 may function as the positive electrode.

The first electrode plate 111 is formed by coating a first electrode active material, such as a transition metal oxide, on a first electrode current collector formed of a metal foil, such as an aluminum foil. A first electrode tab 114 is attached to the first electrode plate 111. One end of the first electrode tab 114 is electrically connected to the first electrode plate 111, and the other end of the first electrode tab 114 upwardly protrudes from the electrode assembly 110 and is electrically connected to the cap assembly 130.

The second electrode plate 112 is formed by coating a second electrode active material, such as graphite or carbon, on a second electrode current collector formed of a metal foil, such as a copper or nickel foil. A second electrode tab 115 is attached to the second electrode plate 112. One end of the second electrode tab 115 is electrically connected to the second electrode plate 112, and the other end of the second electrode tab 115 downwardly protrudes from the electrode assembly 110 and is electrically connected to a bottom surface of the case 120.

The separator 113 is positioned between the first electrode plate 111 and the second electrode plate 112, prevents a short circuit therebetween, and allows lithium ions to move. The separator 113 may include polyethylene, polypropylene, or a composite film of polyethylene and polypropylene.

The case 120 includes a side surface plate 121 having a cylindrically-shaped body having a certain diameter (e.g., having a predetermined diameter) forming a space in which the electrode assembly 110 is accommodated, and a bottom surface plate 122 sealing a bottom end (or bottom portion) of the side surface plate 121. The top opening of the case 120 is opened to be sealed after the electrode assembly 110 is inserted into the case 120. In addition, a beading portion 123 is formed at an upper portion of the case 120 to prevent the electrode assembly 110 from moving (e.g., from moving in the case 120). In addition, a crimping portion 124 is formed at a top end of the case 120 to fix the cap assembly 130 and the gasket 190 thereto.

The cap assembly 130 includes a cap-up 140, a safety vent 150 coupled to a lower portion (e.g., a lower surface) of the cap-up 140, a cap-down 160 installed under the safety vent 150, and an insulator 170 interposed between the safety vent 150 and the cap-down 160. In addition, the cap assembly 130 further includes a sub-plate 180 fixed to a bottom surface of the safety vent 150, exposed through a bottom surface of the cap-down 160, and electrically connected to the first electrode tab 114.

The cap-up 140 has an upwardly convex top portion to be electrically connected to an external circuit. The cap-up 140 is electrically connected to the first electrode tab 114 of the electrode assembly 110 through contact with the sub-plate 180. In order to establish such an electrical connection, the cap-up 140 may be made of a metal, such as aluminum or steel.

In addition, when the safety vent 150 inverts to cut off a connection (e.g., an electrical connection) between the safety vent 150 and the sub-plate 180, the cap-up 140 may provide a path through which internal gases in the case 120 are released.

In some embodiments, the cap-up 140 may include a flange portion 141, bridge portions 142, and a plate portion 143.

The flange portion 141 is physically, electrically coupled to the safety vent 150. The flange portion 141 may be substantially ring-shaped and may be clamped by and fastened to the safety vent 150.

The bridge portions 142 extend from an interior side of the flange portion 141 to upwardly protrude from the flange portion 141. In addition, the bridge portions 142 include a plurality of bridge portions to connect the flange portion 141 to the plate portion 143. The bridge portions 142 include grooves 142a inwardly formed on outer surfaces of the bridge portions 142. The grooves 142a may be formed at boundaries where the bridge portions 142 are connected to the flange portion 141. Therefore, when the safety vent 150 inverts due to increased pressure in the case 120 caused by internal gases generated therein, the bridge portions 142 are ruptured around the grooves 142a by movement of the internal gases. Therefore, the plate portion 143 is opened from its one side such that the internal gases are smoothly released. Accordingly, the stability of the secondary battery 100 can be increased, and chain ruptures or explosions can be prevented by preventing heat and pressure from being transferred to adjacent secondary batteries that are connected to the secondary battery 100 in series/in parallel.

The plate portion 143 is coupled to the flange portion 141 by the bridge portions 142 (e.g., the bridge portions 142 extend between the plate portion 143 and the flange portion 141). The plate portion 143 has an exposed side surface 143a at regions where the bridge portions 142 are not formed (e.g., at regions between adjacent ones of the bridge portions 142), and the internal gases in the case 120 may be released when the safety vent 150 inverts at the exposed regions. In addition, the plate portion 143 is substantially planar to be electrically connected to an external circuit.

The safety vent 150 has a circular plate body 151 shaped to conform with the cap-up 140 and a protruding portion 152 downwardly protruding therefrom at a center or approximately a center of the plate body 151. The safety vent 150 is electrically connected to a sub-plate 180 fixed on a bottom surface of the cap-down 160 by the protruding portion 152, which passes through the center of the cap-down 160. In some embodiments, the protruding portion 152 of the safety vent 150 and the sub-plate 180 may be welded to each other by laser welding, ultrasonic welding, resistance welding, or an equivalent thereof.

The safety vent 150 is installed to be in close contact with (e.g. to directly contact) the flange portion 141 (e.g., the portion of the cap-up 140 other than the upwardly protruding portion of the cap-up 140) and is configured to release the internal gases while blocking the flow of current when an abnormal internal pressure is generated inside the case 120. When the internal pressure in the case 120 becomes equal to or greater than an operating pressure of the safety vent 150, the safety vent 150 electrically disconnects from the sub-plate 180 while the protruding portion 152 of the safety vent 150 upwardly rises due to the internal gases in the case 120.

The cap-down 160 is a circular plate body. An opening 161 (e.g., a through-hole) is formed at a center or approximately a center of the cap-down 160, and the protruding portion 152 of the safety vent 150 passes through the opening 161. In addition, an insulation layer may be formed on a top surface of the cap-down 160. The insulation layer may insulate (e.g., may electrically insulate) the safety vent 150 and the cap-down 160 from each other.

The insulator 170 is interposed between the safety vent 150 and the cap-down 160 and insulates the safety vent 150 and the cap-down 160 from each other. The insulator 170 may be made of a resin material, such as polyethylene (PE), polypropylene (PP), or polyethylene terephthalate (PET).

At normal times (e.g., during normal operation), the sub-plate 180 is coupled between the first electrode tab 114 of the electrode assembly 110 and the safety vent 150. In addition, when the internal pressure in the case 120 is equal to or greater than the operating pressure of the safety vent 150, the sub-plate 180 electrically disconnects from the safety vent 150 while a portion of the sub-plate 180 that is welded to the protruding portion 152 is ripped. In addition, when the internal pressure in the case 120 is equal to or greater than a rupture pressure, which is greater than the operating pressure of the safety vent 150, the safety vent 150 ruptures.

In some embodiments, the sub-plate 180 is positioned under the cap-down 160. The sub-plate 180 is welded between the protruding portion 152 of the safety vent 150, which passes through the cap-down 160, and the first electrode tab 114. Accordingly, the sub-plate 180 electrically connects the first electrode tab 114 and the protruding portion 152 to each other. If the internal pressure in the case 120 increases, the protruding portion 152 of the safety vent 150 inverts, thereby electrically disconnecting the sub-plate 180 from the protruding portion 152 of the safety vent 150. Therefore, the safety vent 150 may be electrically disconnected from the first electrode tab 114.

The gasket 190 is installed at a top end opening of the case 120. For example, the gasket 190 is assembled such that it is closely installed between the cap-up 140 and an outer periphery of the safety vent 150 and the top end opening of the case 120. The gasket 190 may prevent the cap assembly 130 from being separated from the case 120.

In the secondary battery 100 according to embodiments of the present invention, the cap-up 140 includes the grooves 142a formed between the flange portion 141 and the bridge portions 142 to allow the internal gases in the case 120 to be easily released due to rupturing of the cap-up 140 during the operation of the safety vent 150, thereby increasing the overall stability of the secondary battery 100 and preventing or reducing the risk of chain ruptures or explosions.

Hereinafter, a configuration of a secondary battery according to another embodiment of the present invention will be described.

Figure 4:
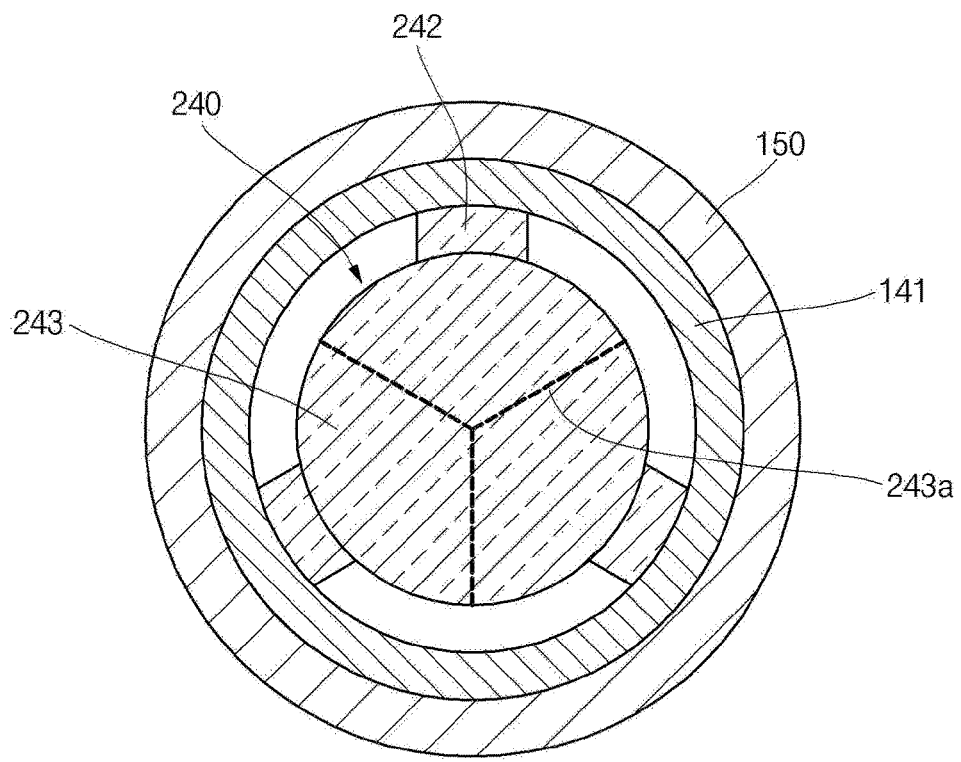
FIG. 4 is a plan view illustrating a connection relationship between a cap-up and a safety vent in a secondary battery according to another embodiment of the present invention.
Figure 5:
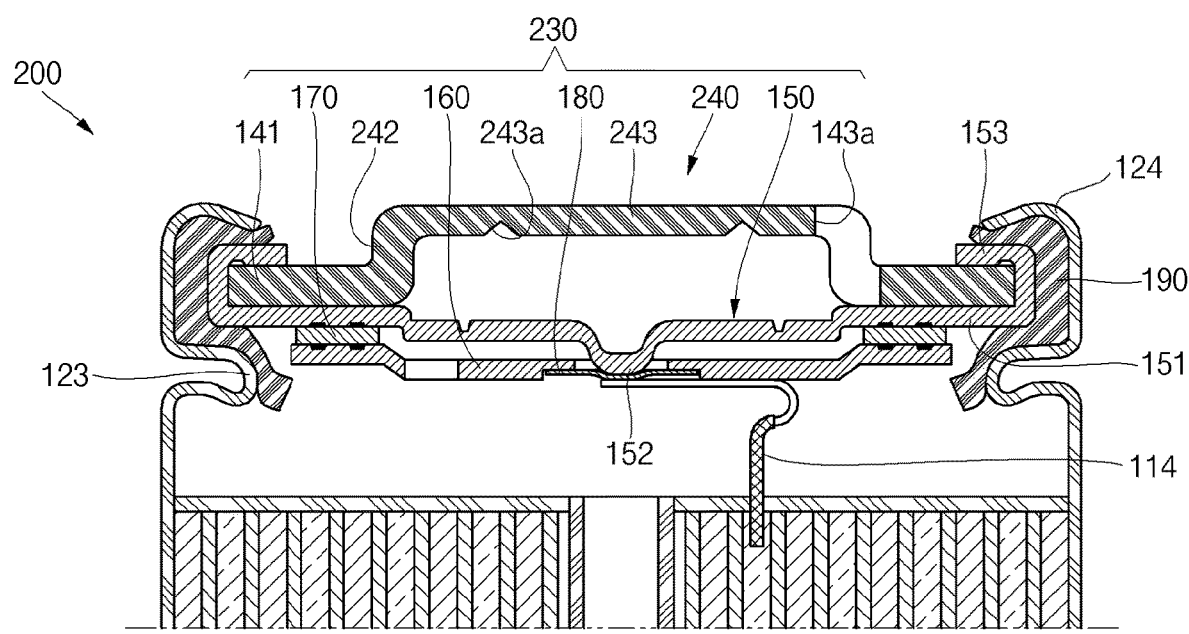
FIG. 5 is an enlarged cross-sectional view illustrating the connection relationship between the cap-up and the safety vent in the secondary battery illustrated in FIG. 4.

FIG. 4 is a plan view illustrating a connection relationship between a cap-up and a safety vent in a secondary battery according to another embodiment of the present invention, and FIG. 5 is an enlarged cross-sectional view illustrating the connection relationship between the cap-up and the safety vent in the secondary battery illustrated in FIG. 4.

Referring to FIGS. 4 and 5, the secondary battery 200 according to another embodiment of the present invention includes an electrode assembly 110, a case 120 accommodating the electrode assembly 110, a cap assembly 230 coupled to a top end opening of the case 120, and a gasket 190 tightly coupling the case 120 and the cap assembly 230 to each other. The same or substantially similar components as those of the previous embodiment are denoted by the same reference numerals, and the following description may focus on differences between the present and previous embodiments.

The cap assembly 230 may include a cap-up 240, a safety vent 150, a cap-down 160, an insulator 170, and a sub-plate 180.

The cap-up 240 may include a flange portion 141, bridge portions 242, and a plate portion 243.

The bridge portions 242 are formed to extend from the flange portion 141. The bridge portions 242 include a plurality of bridge portions upwardly protruding from the flange portion 141 and connect the flange portion 141 and the plate portion 243 to each other.

The plate portion 243 includes grooves 243a formed on its inner surface. As indicated by the dotted lines of FIG. 4, the grooves 243a may be formed along the inner surface of the plate portion 243 in a certain pattern (e.g., in a predetermined pattern). For example, the grooves 243a are formed to meet together at a center or approximately a center of the plate portion 243 so as to have a substantially "Y"-shaped configuration. In some embodiments, the grooves 243a may be a wholly connected line (e.g., may be a continuous groove and may be curved line) or a centrally disconnected pattern (e.g., ones of the grooves may be spaced from each other). In these embodiments, if the safety vent 150 operates due to an increased internal pressure in the case 120, the plate portion 243 may rupture due to internal gases generated in the case 120. The rupture of the plate portion 243 may be induced according to the shapes of the grooves 243a, and the plate portion 243 may be ruptured while a central region of the plate portion 243 upwardly protrudes. Accordingly, the internal gases may be easily released to the outside of the case 120 through the cap-up 240.

Hereinafter, a configuration of a secondary battery according to another embodiment of the present invention will be described.

Figure 6:
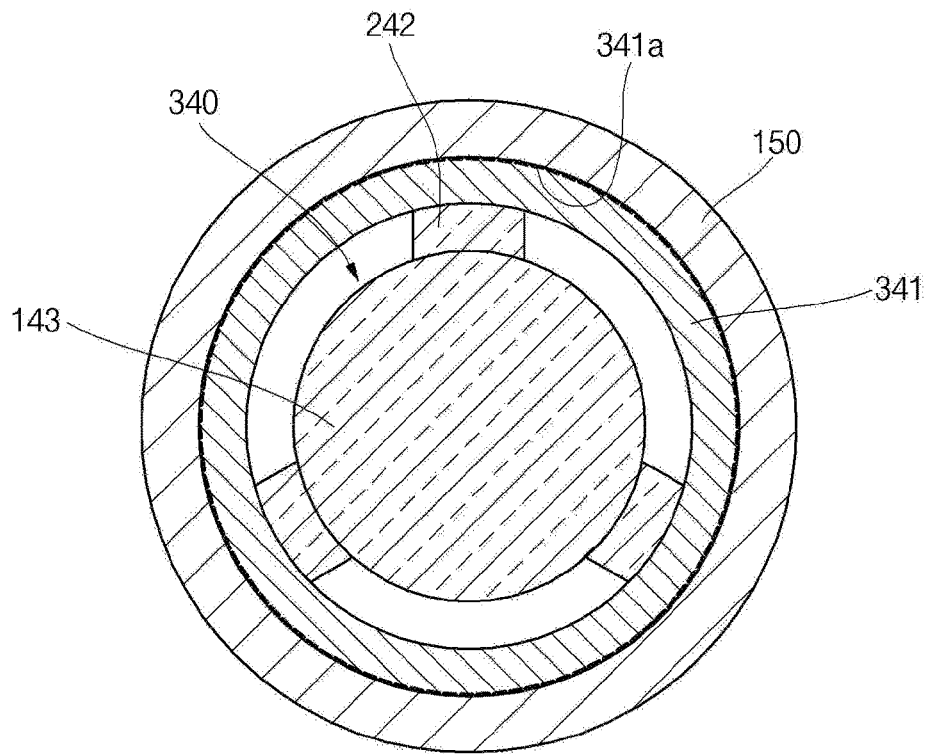
FIG. 6 is a plan view illustrating a connection relationship between a cap-up and a safety vent in a secondary battery according to another embodiment of the present invention.
Figure 7:
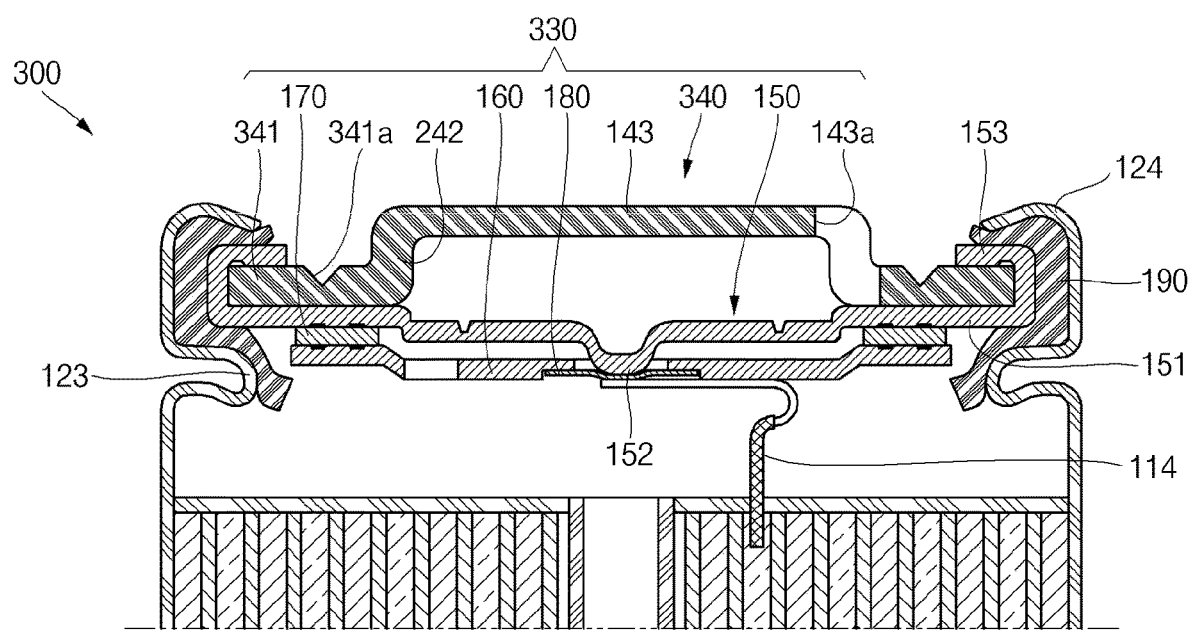
FIG. 7 is an enlarged cross-sectional view illustrating the connection relationship between the cap-up and the safety vent in the secondary battery illustrated in FIG. 6.

FIG. 6 is a plan view illustrating a connection relationship between a cap-up and a safety vent in a secondary battery according to another embodiment of the present invention, and FIG. 7 is an enlarged cross-sectional view illustrating the connection relationship between the cap-up and the safety vent in the secondary battery illustrated in FIG. 6.

Referring to FIGS. 6 and 7, the secondary battery 300 according to another embodiment of the present invention includes an electrode assembly 110, a case 120 accommodating the electrode assembly 110, a cap assembly 330 coupled to a top end opening of the case 120, and a gasket 190 tightly coupling the case 120 and the cap assembly 330 to each other.

The cap assembly 330 may include a cap-up 340, a safety vent 150, a cap-down 160, an insulator 170, and a sub-plate 180.

The cap-up 340 may include a flange portion 341, bridge portions 242, and a plate portion 143.

The flange portion 341 may have a ring shape and may be clamped by and fastened to the safety vent 150. In addition, the flange portion 341 may include grooves 341a formed at its non-clamped and fastened regions (e.g., at regions of the flange portion 341 other than the clamped and fastened regions).

The grooves 341a may be formed in a ring shape along the outer surface of the flange portion 341 according to the shape of the flange portion 341. The grooves 341a may be a wholly connected line (e.g., may be a continuous groove) or a centrally disconnected pattern (e.g., ones of the grooves may be spaced from each other). The grooves 341a may cause a rupture of the cap-up 340 from the flange portion 341 when the safety vent 150 operates. Therefore, the internal gases generated in the case 120 may rupture the cap-up 340 to then move to the outside of the case 120. In such a manner, the internal gases can be easily released.

Hereinafter, a configuration of a secondary battery according to another embodiment of the present invention will be described.

Figure 8:
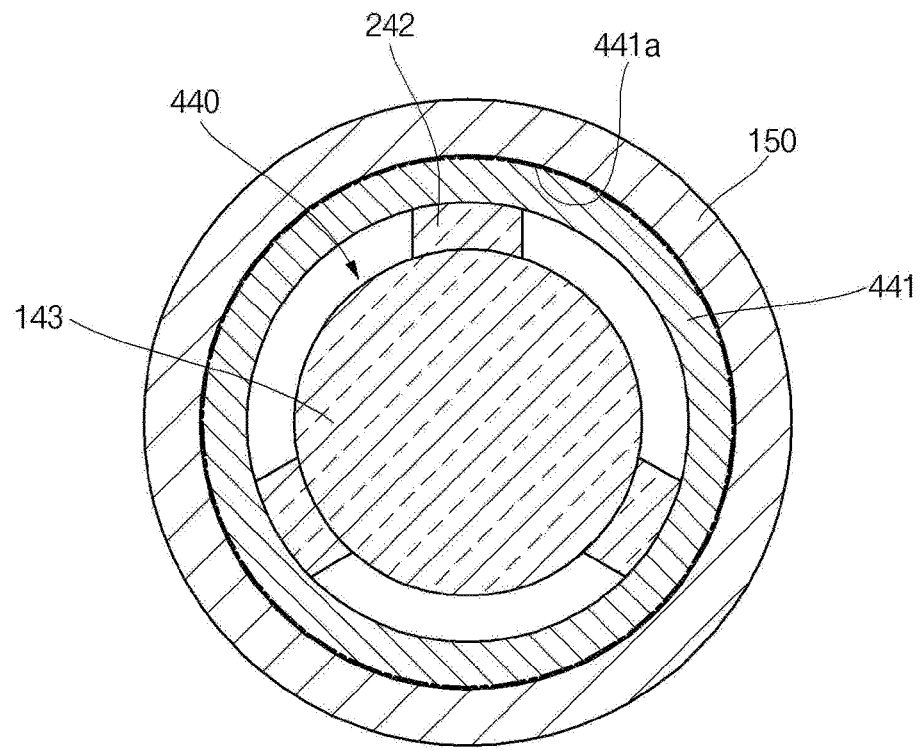
FIG. 8 is a plan view illustrating a connection relationship between a cap-up and a safety vent in a secondary battery according to another embodiment of the present invention.
Figure 9:
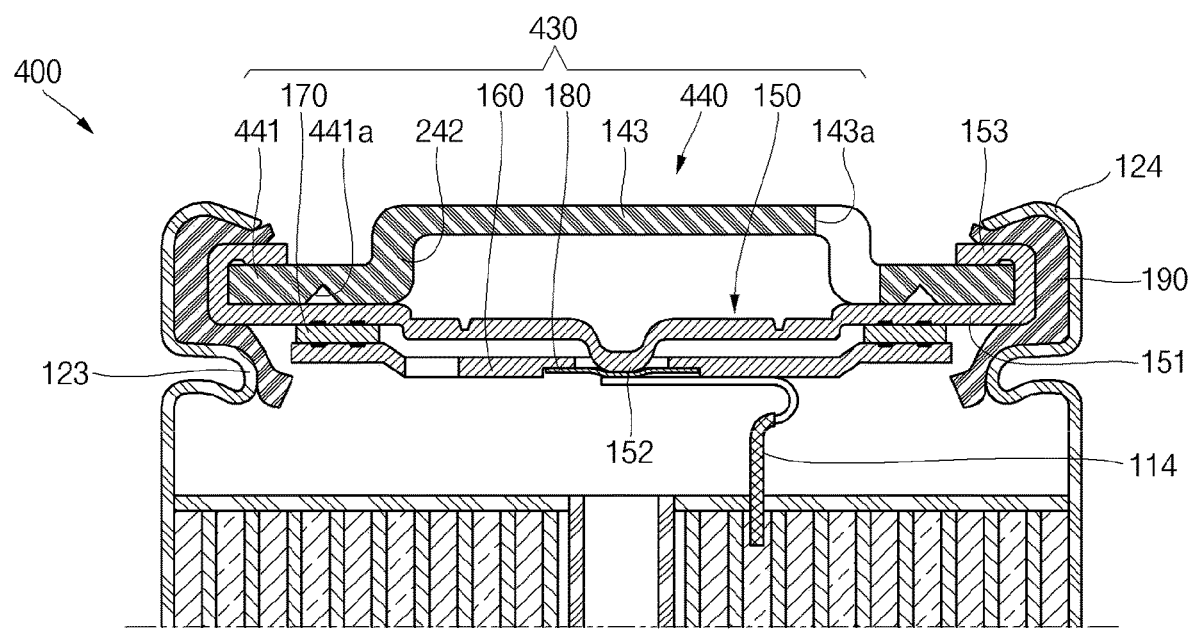
FIG. 9 is an enlarged cross-sectional view illustrating the connection relationship between the cap-up and the safety vent in the secondary battery illustrated in FIG. 8.

FIG. 8 is a plan view illustrating a connection relationship between a cap-up and a safety vent in a secondary battery according to another embodiment of the present invention, and FIG. 9 is an enlarged cross-sectional view illustrating the connection relationship between the cap-up and the safety vent in the secondary battery illustrated in FIG. 8.

Referring to FIGS. 8 and 9, the secondary battery 400 according to another embodiment of the present invention includes an electrode assembly 110, a case 120 accommodating the electrode assembly 110, a cap assembly 430 coupled to a top end opening of the case 120, and a gasket 190 tightly coupling the case 120 and the cap assembly 430 to each other.

The cap assembly 430 may include a cap-up 440, a safety vent 150, a cap-down 160, an insulator 170, and a sub-plate 180.

The cap-up 440 may include a flange portion 441, bridge portions 242, and a plate portion 143.

The flange portion 441 may have a ring shape and may be clamped by and fastened to the safety vent 150. In addition, the flange portion 441 may include grooves 441a formed at its non-clamped and fastened regions (e.g., at regions of the flange portion 441 other than the clamped and fastened regions).

The grooves 441a may be formed in a ring shape along the inner surface of the flange portion 441 according to the shape of the flange portion 441. The grooves 441a may be a wholly connected line (e.g., may be a continuous groove) or a centrally disconnected pattern (e.g., ones of the grooves may be spaced from each other). The grooves 441a may also cause a rupture of the cap-up 440 from the flange portion 441 when the safety vent 150 operates. Therefore, the internal gases generated in the case 120 may rupture the cap-up 340 to then move to the outside of the case 120. In such a manner, the internal gases can be easily released.

While secondary batteries according to exemplary embodiments of the present invention have been particularly shown and described, it will be understood by those of ordinary skill in the art that various changes in form and details may be made therein without departing from the spirit and scope of the present invention as defined by the following claims and their equivalents.

What is claimed is:
1. A secondary battery comprising:
an electrode assembly;
a case accommodating the electrode assembly; and
a cap assembly coupled to a top portion of the case, the cap assembly comprising:

a safety vent;

a cap-up having cap-up grooves on a surface thereof and having a first thickness at the cap-up grooves that is less than a second thickness at an area adjacent to the cap-up grooves;

a cap-down below the cap-up and defining a cap-down groove; and a sub-plate accommodated in the cap-down groove, wherein the safety vent comprises a downwardly protruding portion, the safety vent being under the cap-up, electrically connected to the electrode assembly at the protruding portion, and physically connected to the sub-plate at the protruding portion, wherein the sub-plate is physically connected to the electrode assembly, and wherein the cap-up grooves define an open space.

2. The secondary battery of claim 1, wherein the cap-up comprises a flange portion contacting and coupled to the safety vent, a plurality of bridge portions protruding from the flange portion, and a plate portion at an interior edge of the bridge portions and coupled to the bridge portions.

3. The secondary battery of claim 2, wherein the cap-up grooves are on a surface of the flange portion.

4. The secondary battery of claim 2, wherein the flange portion has a ring shape, and the cap-up grooves are arranged according to the shape of the flange portion.

5. The secondary battery of claim 4, wherein the cap-up grooves are connected to each other such that they form a continuous groove.

6. The secondary battery of claim 4, wherein ones of the cap-up grooves are spaced from each other.

7. The secondary battery of claim 2, wherein at least one of the cap-up grooves is on a surface of each of the bridge portions.

8. The secondary battery of claim 7, wherein the bridge portions comprise a plurality of bridge portions connecting the flange portion and the plate portion to each other, and the cap-up grooves are at boundaries between the bridge portions and the flange portion.

9. The secondary battery of claim 7, wherein the plate portion has a circular plate shape, and the cap-up grooves meet at the center of the plate portion and are arranged in a Y-shaped configuration.

10. The secondary battery of claim 7, wherein the cap-up grooves are connected to each other such that they form a continuous groove.

11. The secondary battery of claim 7, wherein ones of the cap-up grooves are spaced from each other.

* * * * *